Figure 1:
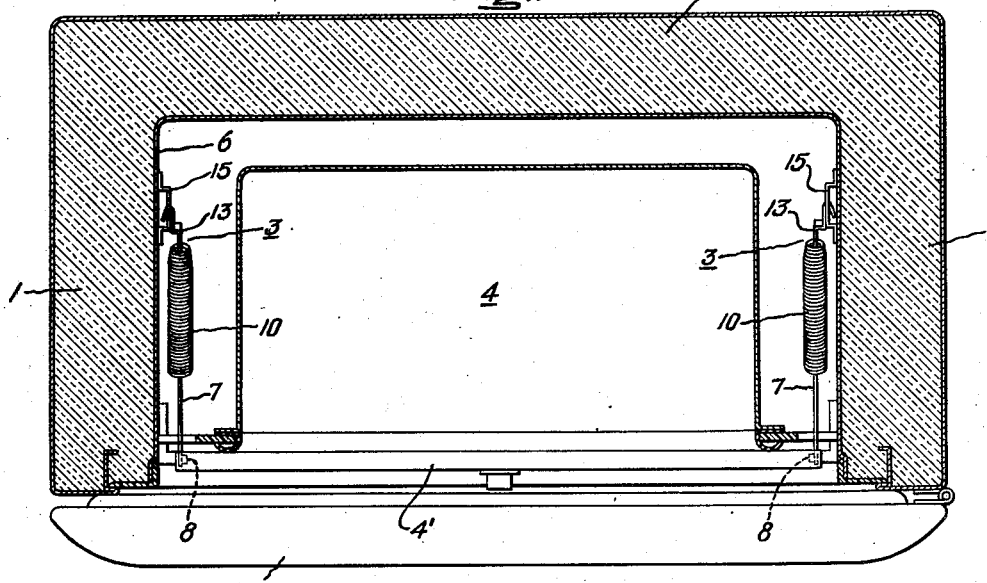

Nov. 3, 1953 R. J. CARBARY 2,657,420
SPRING TERMINAL FITTING
Filed Nov. 24, 1950 2 Sheets-Sheet 1

Inventor:
Richard J. Carbary,
by *William B. Edwards, Jr.*
His Attorney.

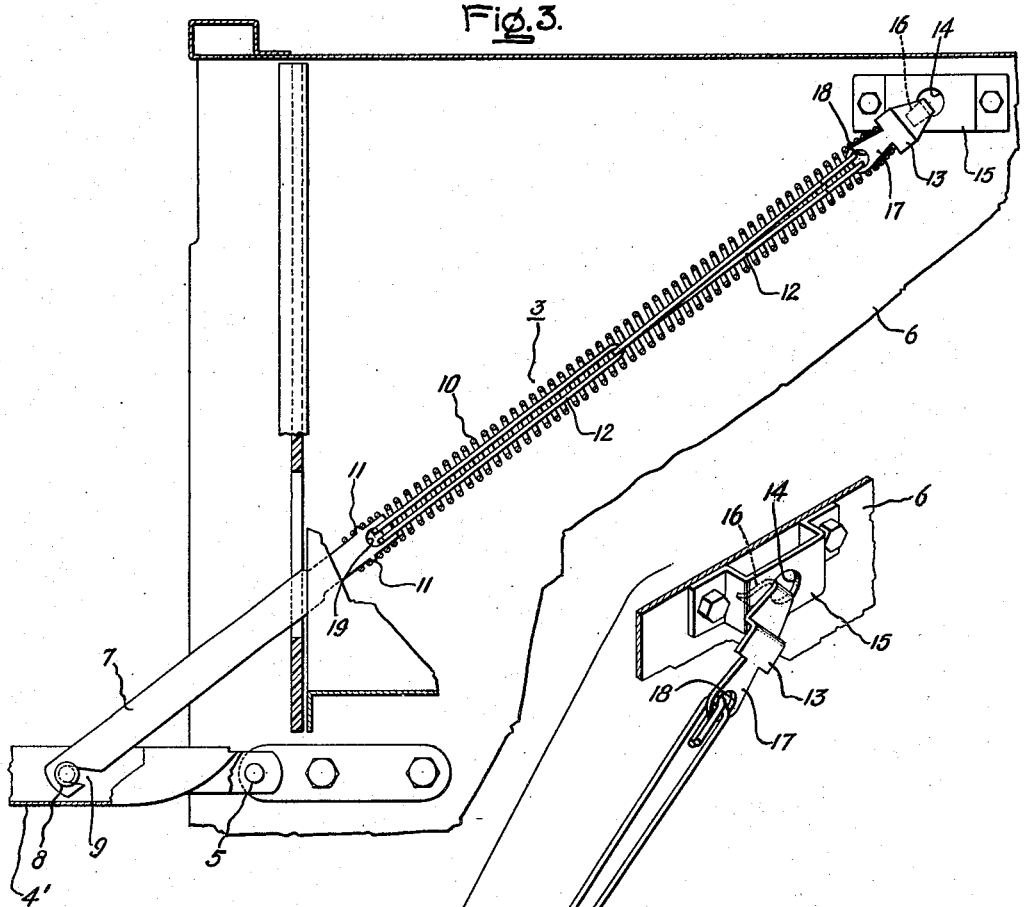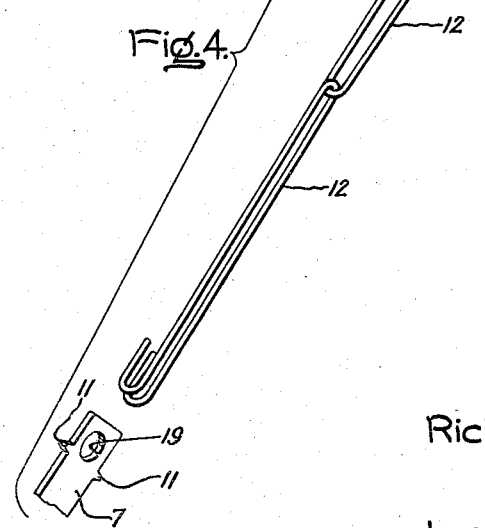

Patented Nov. 3, 1953

2,657,420

UNITED STATES PATENT OFFICE 2,657,420

SPRING TERMINAL FITTING

Richard J. Carbary, Erie, Pa., assignor to General Electric Company, a corporation of New York Application November 24, 1950, Serial No. 197,355

4 Claims. (Cl. 16—72)

1

My invention relates to spring assemblies adapted for use with evaporator doors and the like and, more particularly, to terminal fastening devices for such assemblies employed for attaching the ends of helical springs which may have their effective length varied and adjusted.

In many applications of helical springs, it is desirable that the effective length of a spring be readily adjustable, in order that the tension for a given displacement may be varied, or in order that corrections may be made for slight spring fatigue. In the past, adjustments were made by the obvious methods of moving the anchor point of one end of the spring or by cutting off or stretching a portion of the spring. These methods required partial disassembly of the spring device and were, therefore, time-consuming and inconvenient, especially in cases where the spring device was intricate. Various improvements have been since made in the art for adjusting the effective length or tension of a helical spring without disassembly of parts by use of an element having screwable engagement with the coils of the spring. However these either require that one of the members between which the spring is supported be rotatable, or they are of such nature as to be more expensive and difficult to manufacture than the present invention.

It is, therefore, an object of my invention to provide a new and simplified terminal fitting for helical springs allowing more convenient adjustment of the effective lengths of helical springs.

It is, also, an object of my invention to provide a terminal fitting for helical springs whereby the effective length of a helical spring may be varied quickly with no disassembly of the spring mechanism being required.

In carrying out my invention, I provide a hook, screw, or other fastener on one end of a terminal fitting for a helical spring, and provide on the other end a lug flaring in width toward its end. A helical spring is positioned with one end portion disposed on the lug and made correspondingly tapered in inner diameter toward this end. One end of the spring is thus fastened to its support through the terminal fitting by the fastener in a manner that secures the spring against axial pull but, however, leaves it free to be rotated. The other end of the spring is fastened to its support through an arm having lateral projections on one end which screwably engage the convolutions of the spring. Therefore, when the spring is rotated axially it turns freely upon the aforementioned lug, and the projections move to engage different convolutions of the spring,

2 whereby the effective length or the tension of the spring is quickly and conveniently varied.

Figure 2:
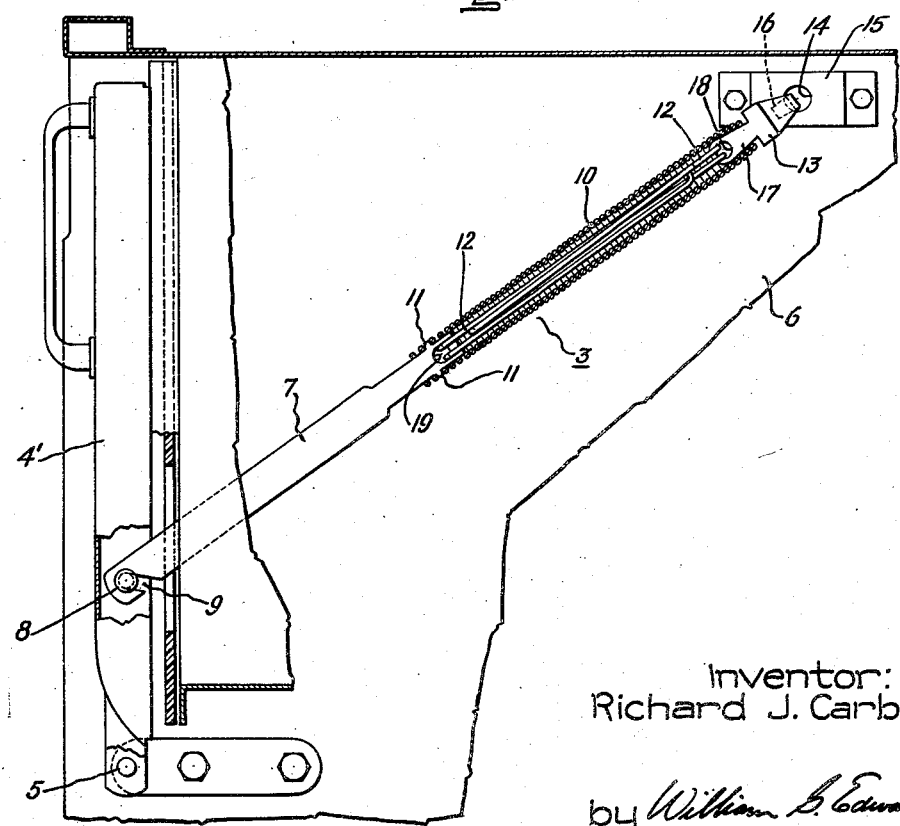

For a better understanding of the objects and advantages of my invention, reference should be had to the following description and to the accompanying drawings, in which Fig. 1 is a sectional plan view of a refrigerator showing the evaporator of the refrigerator; Fig. 2 is a partial side elevation view, partly broken away, of the same refrigerator with the evaporator door in the normally closed position; Fig. 3 is the same as Fig. 2, except that the evaporator door is in its open position and only partially shown; and Fig. 4 is an enlarged perspective view of the evaporator door spring assembly with the spring omitted for clarity.

In Fig. 1, I have shown a refrigerator having insulated walls 1 and a door 2, which opens about a hinge in its side edge, and containing an evaporator compartment 4 closed by a door 4'. A pair of spring assemblies 3, shown as a typical application of adjustable helical springs, are fastened at opposite ends to the evaporator door 4', which pivots on a hinge 5 in its lower edge, and to the refrigerator liner 6 and serve to aid in closing the evaporator door 4' and to bias it tightly shut.

Referring to the other figures, the spring assembly 3 consists of an arm 7 engaging a pin 8 on door 4' by means of slot 9, a helical spring 10 screwably attached to arm 7 by means of diagonally opposite projections 11 which are spaced to engage convolutions of the spring 10, two hairpin-like wire elements 12 for limiting the maximum door opening, and a spring terminal fitting 13 which is hooked into an opening 14 formed in a bracket 15 bolted to liner 6.

Terminal fitting 13 comprises on one end a hook 16 for engaging bracket 15, and on the other end of a lug 17 flaring toward its free end. The section of spring 10 which terminates on lug 17 is correspondingly tapered toward its end so that the spring 10 is firmly fastened to terminal fitting 13 against axial pull, but so that spring 10 may be easily rotated about its axis while so engaged with lug 17. The end of spring 10 may be wound about lug 17 as a mandrel to effect this unique co-engagement, or the lug 17 may be forced into the spring end after each is made to the proper dimensions.

An opening 18 is provided in lug 17 to receive the hooked end of one of the hairpin-like elements 12, and an opening 19 is similarly provided in arm 7 for the other element 12. These hairpin-like elements 12 are slidably linked together so that they limit the maximum elongation and prevent over-stressing of the spring 10. The principle of operation of elements 12 is well known to the art and forms no part of this invention.

In operation, door 4' is manually pulled open by its handle, the opening movement being rotation about hinge 5 in the door's lower edge, which causes pin 8 to increase its distance from stationary bracket 15. Arm 7 rotates around pin 8 and terminal fitting 13 rotates in opening 14 so that the spring assembly 3 continuously forms a straight line connection spanning the increasing distance by increasing the elongation and tension in spring 10. Hairpin-like elements 12 solidly contact each other and prevent over-travel from the door's wide open position, as shown in Fig. 3. Extended spring 10 automatically closes the door 4' when the manual pull is released, or it materially aids manual closing of the door. Spring 10 may be adjusted with initial tension to bias the door 4' firmly in its closed position.

The effective length of spring 10 may be varied, to adjust its biasing tension or to correct for slight fatigue, by manually rotating spring 10 about its axis in the desired direction. This may be done with no disassembly of parts, since terminal fitting 13 allows such rotation by virtue of its tapering fit with spring 10. The rotation causes projections 11 to move by screw-like action to engagement with different convolutions of the spring 10, whereby the effective length of spring 10 is either increased or decreased. It is seen, therefore, that spring 10 is firmly fastened at its ends against axial pull but that it may be manually rotated to adjust its effective length. The broad idea of the engagement of spring 10 by projections 11 to allow the screw-like movement of projections 11 in the convolutions of the spring 10 is well known to the art and forms no part of this invention.

Terminal fitting 13 is one element of my invention which allows the axial rotation of the spring 10 necessary to the screw-like adjustment of effective length with no disassembly of parts or use of tools. At any position in the rotation of spring 10, the spring is firmly fastened against axial pull.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A helical spring and adjustable mounting therefor comprising a first terminal threadably engaging one end of said spring, and a second terminal engaging the other end of said spring, said other end of said spring comprising a plurality of turns decreasing in radius from the main body of said spring toward said other end, and said second terminal having one end for attachment to a support and its other end shaped to engage the inner sides of said turns and being freely rotatable with respect thereto whereby said spring will be retained on said second terminal when under tension and may be rotated on said second terminal for purposes of adjustment.

2. A helical spring device comprising a helical spring having a first end of uniform inside diameter and a second end of inside diameter tapered toward said second end, an arm with lateral projections on one end thereof for screwably engaging the convolutions of said first end, and a terminal fitting having a lug flaring in width fitted within said second end, whereby said arm and said terminal fitting are secured to said spring against axial pull but whereby axial rotation for adjustment of the effective length of said spring is afforded.

3. In a construction including a frame and a door hinged thereto, a spring assembly for closing said door, said spring assembly including an arm provided with lateral projections and with a slot for removable attachment to said door, a terminal fitting having a flared portion and a hook for engaging said frame, and a helical spring mounted between said arm and said terminal fitting by engagement with said lateral projections and said flared portion, the portion of said spring engaging said flared portion being tapered toward its outer end, whereby relative rotational, but not relative axial, movement of said spring and said arm and fitting is afforded to allow screw-like movement between said projections and said spring for varying the effective length of said spring.

4. In a construction including a door hinged to a frame, a door closing device comprising an arm provided with a slot formed in one end thereof for removable attachment to said door, a terminal fitting having one end thereof flaring in width and the other end thereof formed into a hook for engagement with said frame, and a helical spring secured between opposed ends of said arm and said terminal fitting, the end of said arm opposite said one end having lateral projections thereon for engagement with the convolutions at one end of said spring, the other end of said spring having a tapered inner diameter to engage said one end of said terminal fitting.

RICHARD J. CARBARY.

References Cited in the file of this patent

UNITED STATES PATENTS

| Number | Name | Date |
|---|---|---|
| 1,695,454 | Coyne | Dec. 18, 1928 |
| 1,771,299 | Justus | July 22, 1930 |
| 1,819,187 | McFerren | Aug. 18, 1931 |
| 2,085,387 | Pletcher et al. | June 29, 1937 |
| 2,547,172 | Reeves | Apr. 3, 1951 |